June 1, 1954 P. E. CLINGMAN 2,679,915
SEALING STRIP
Filed June 19, 1952
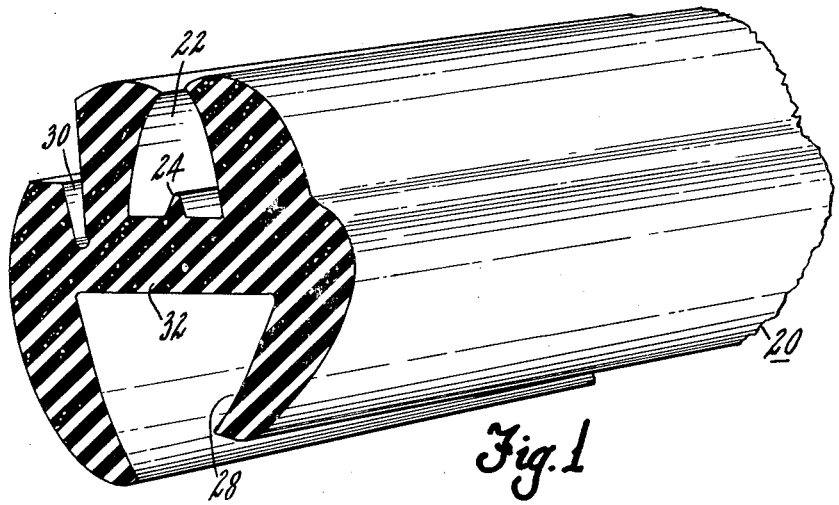
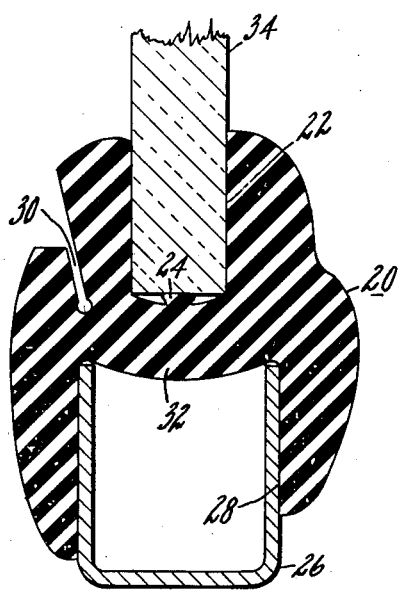
INVENTOR.
PAUL E. CLINGMAN
BY
HIS ATTORNEYS Patented June 1, 1954

2,679,915

UNITED STATES PATENT OFFICE 2,679,915

SEALING STRIP

Paul E. Clingman, Dayton, Ohio, assignor to General Motors Corporation, Detroit, Mich., a corporation of Delaware Application June 19, 1952, Serial No. 294,418

4 Claims. (Cl. 189—78)

This invention relates to sealing strips and is particularly concerned with self-adjusting sealing strips for connecting two panels, one to the other.

In application Serial No. 294,417 filed concurrently herewith, I have shown a self-adjusting type of sealing strip which self-adjusts the glass-receiving channel in accordance with the shape and dimension of the glass to be sealed therein. This invention is directed to a modified construction which may be used for the same purpose as the strip shown in the foregoing application wherein modifications in panel design are possible for providing a channel-like member for receiving the sealing strip. In other words, the present invention requires a special design of panel for its use.

It is therefore an object of this invention to provide a sealing strip of deformable rubber-like material used for connecting two panels, one of which includes an open channel along the edge to be sealed, which channel is embraced by the sealing strip and provides an opening thereunder for movement of a portion of the sealing strip for permitting self-adjustment thereof with respect to misalignment of the other panel to be joined and sealed.

Further objects and advantages of the present invention will be apparent from the following description, reference being had to the accompanying drawing, wherein a preferred embodiment of the present invention is clearly shown.

In the drawing:

Fig. 1 shows a cross section of a sealing strip in perspective.

Fig. 2 shows a cross section of said sealing strip in assembled relation to a body member and a pane of glass.

Referring to the drawing, 20 illustrates an elongate strip or body of deformable resilient rubber-like material which includes a longitudinally extending groove 22 therein that extends the entire length of the strip 20. The groove 22 has a projection 24 at the bottom thereof which extends the full length of the groove to aid in sealing. The glass or other panel to be used with the strip 20 is positioned within the groove 22 so that the projection 24 is partially mushroomed or compressed as shown in Fig. 2 to increase the grip on the glass, etc.

The strip 20 is adapted to be positioned on a body or panel which includes a channel portion 26 that fits within a longitudinally extending groove 28 in the portion 20. The groove 28 is in opposed relation to the groove 22. The side lips of the grooves 28 and 22 are extruded or molded so as to require spreading in order to assemble panels, panes, etc., therein. This provides a close, non-leaking fit.

In the strip shown in Figs. 1 and 2, a third groove 30 may be provided for the attachment of a garnish molding or other ornamentation. This groove 30 does not necessarily have to be used and is a matter of choice.

It is noted from viewing Fig. 2 that the important dimensions of the strip are three in number, namely, the width of the pane-receiving groove 22, the width of the channel-receiving groove 28 and the thickness of the connecting wall 32 between the grooves. From the drawing, it is obvious that the channel-receiving groove 28 must be wider than the glass thickness or the glass-receiving groove 22 and in this respect, the channel-receiving groove and the glass-receiving groove must be in a ratio of at least 8 to 5. This ratio may be increased if desired with no ill effects since it is apparent that the greater the ratio the more the flexibility of the strip.

The thickness of the cross wall 32 is also important although this will vary in accordance with the hardness of the material used. When using 50 hard (Durometer reading) rubber, a ratio of 2 to 1, is entirely satisfactory between the width of the channel-receiving groove 28 and the connecting portion or cross wall 32. This ratio will necessarily be increased for harder rubbers and decreased for softer rubbers.

When utilizing the proportions described herein the cross wall 32 will be sufficiently flexible so that the panel or glass pane shown at 34 can flex the cross wall downwardly within the channel 26 for self-adjusting the strip for misalignment or dimensional inaccuracies. In this respect, the cross wall 32 acts somewhat in a similar manner to the glass-receiving groove mentioned in my copending application in that the cross wall 32 is movable within the metal channel 26 to accommodate the position of the pane 34.

The use of the projection 24 while increasing the grip of the sides of groove 22 on the glass, also tends to improve the flexing qualities of the connecting portion 32 since the glass actually bears on the center of this connection portion through the projection 24.

The material from which the strip may be made may be any deformable, resilient rubber-like material. Natural rubber, vulcanizable copolymers, mixtures thereof, suitable synthetic resins including vinyl compounds, etc., are all satisfactory as is any other material falling in the same general classes of compounds which exhibit the desired physical characteristics.

While the embodiment of the present invention as herein disclosed, constitutes a preferred form, it is to be understood that other forms might be adopted.

What is claimed is as follows:

1. A self-adjusting connector strip assembly adapted to be used in connection with an opening in an automobile body and the like wherein a pane of glass is to be inserted within the opening and held to the body by said connector strip assembly, the combination comprising a peripherally extending open channel-like member around said opening wherein the open side of channel-like member is faced inwardly of said opening; an elongate, deformable, resilient rubber-like body portion of a length sufficient to extend entirely around said opening, said body portion including a groove at one side thereof having a width sufficient to snugly engage portions of the open channel-like member and close the open side of the same and also including an opposed groove at the opposite side of the strip for receiving the pane of glass and a separate portion between said grooves, the ratio of the width of said channel-receiving groove to said glass-receiving groove being so dimensioned that the separating portion between said grooves which supports the edges of said pane is capable of being deformed downwardly into the open side of said open channel-like member for self-adjusting the strip against inaccuracies of dimension within the glass pane.

2. A connector strip as set forth in claim 1, wherein a longitudinally extending projection is provided at the base of the glass-receiving groove, said projection aiding in deforming the separating portion when a glass pane is pressed thereagainst.

3. The self-adjusting connector strip assembly adapted to be used in connection with an opening in a wall and the like wherein a panel is to be inserted in said opening and held to the wall by said connector strip assembly, the combination comprising a peripherally extending open channel-like member around said opening wherein the open side of said channel-like member is faced inwardly of said opening; an elongate, deformable, resilient rubber-like body portion of sufficient length to extend entirely around said opening, a groove at one side of said body portion of a width sufficient to snugly engage portions of the outer walls of the open channel-like member extending around said opening and said body portion also including an opposed groove at the other side of said strip for receiving said panel to be held to said wall by said strip, and a separating portion in the body of said strip between the bases of said two grooves adapted to support the panel and bridge the opening in the channel-like member the ratio of the width of said channel-receiving groove to said panel-receiving groove being so dimensioned that when said panel is in position, with respect to said strip, said separating portion is bowed downwardly within said open channel-like member for self-adjusting the strip against inaccuracies of dimension within said panel.

4. A self-adjusting connector strip assembly adapted for use in connection with an opening in a wall and the like wherein a panel is inserted in said opening, and is held to the wall by said connector strip assembly; the combination comprising, a peripherally extending substantially rigid U-shaped member positioned around said opening wherein the open side of the U-shaped member faces inwardly of said opening, an elongate deformable resilient connector strip bridging said channel-like member adjacent the open side thereof and snugly engaging portions of the member, said connector strip having a substantially H-shaped cross section wherein the pair of legs on that portion of the H which straddle the channel are more widely separated than the pair of legs of the H opposed thereto, which second pair of legs are adapted to engage a panel therebetween which is supported by the connecting portion between said pair of legs, the relative lateral distances between the two pairs of legs of said H-shaped cross section being so dimensioned with respect to the width of the open side of said U-shaped member that the connecting portion of the connector strip between said pairs of legs is deformable downwardly into said U-shaped member for accommodating dimensional variations in said panel with respect to said opening.

References Cited in the file of this patent

UNITED STATES PATENTS

| Number | Name | Date |
|---|---|---|
| 2,255,725 | Trescher | Sept. 9, 1941 |